United States Patent
Yokota et al.

(10) Patent No.: US 8,194,030 B2
(45) Date of Patent: Jun. 5, 2012

(54) DISPLAY DEVICE FOR VEHICLE

(75) Inventors: Naoki Yokota, Takahama (JP); Yukihide Shibata, Kariya (JP); Munechika Okita, Nisshin (JP)

(73) Assignees: Denso Corporation, Kariya, Aichi-Pref. (JP); Toyota Jidosha Kabushiki Kaisha, Toyota, Aichi-Pref. (JP)

( * ) Notice: Subject to any disclaimer, the term of this patent is extended or adjusted under 35 U.S.C. 154(b) by 392 days.

(21) Appl. No.: 12/507,920

(22) Filed: Jul. 23, 2009

(65) Prior Publication Data

US 2010/0079367 A1    Apr. 1, 2010

(30) Foreign Application Priority Data

Jul. 24, 2008   (JP) .................................. 2008-191406

(51) Int. Cl.
  *G09G 3/36*   (2006.01)
(52) U.S. Cl. ............ 345/102; 345/89; 345/690; 345/77; 345/204; 362/97.1
(58) Field of Classification Search .................. 345/89, 345/102, 690, 7–9, 77–83, 204; 362/97.1–97.3
See application file for complete search history.

(56) References Cited

U.S. PATENT DOCUMENTS

| | | | | |
|---|---|---|---|---|
| 7,053,881 B2 * | 5/2006 | Itoh | ............................... | 345/102 |
| 7,289,100 B2 * | 10/2007 | Sohn et al. | ..................... | 345/102 |
| 7,576,717 B2 * | 8/2009 | Lee et al. | ......................... | 345/77 |
| 7,659,880 B2 * | 2/2010 | Miyazawa | .................... | 345/102 |
| 7,825,893 B2 * | 11/2010 | Oka et al. | ...................... | 345/102 |
| 2002/0057252 A1 | 5/2002 | Onodera | | |
| 2008/0252579 A1 * | 10/2008 | Kato et al. | ...................... | 345/87 |
| 2009/0262063 A1 * | 10/2009 | Fujine et al. | .................. | 345/102 |
| 2010/0103204 A1 * | 4/2010 | Shibata et al. | ................ | 345/690 |

FOREIGN PATENT DOCUMENTS

| | | |
|---|---|---|
| EP | 0 494 606 | 7/1992 |
| JP | 2007-091030 | 4/2007 |
| JP | 2008-158497 | 7/2008 |

* cited by examiner

*Primary Examiner* — Lun-Yi Lao
*Assistant Examiner* — Tom Sheng
(74) *Attorney, Agent, or Firm* — Nixon & Vanderhye PC

(57) ABSTRACT

A display device for vehicle includes an LCD panel that has a first pixel region and a second pixel region. The display controller portion displays a meter image on the first pixel region at a regular time and a specific time, and displays an outside image on the second pixel region at the specific time. The display controller portion controls a gradient ratio of pixel in the first pixel region as a meter image gradient ratio, and controls a gradient ratio of pixel in the second pixel region as an outside image gradient ratio. The display controller portion switches and performs a first mode and a second mode. In the first mode, the display controller portion keeps both the meter image gradient ratio and the outside image gradient ratio to the maximum ratio R1max and R2max, and varies a source luminance of a light source according to an adjust value which is in a side brighter than a reference value Cb. In the second mode, the display controller portion keeps the source luminance of the light source at the minimum source luminance Lmin, varies the meter image gradient ratio according to an adjust value which is in a side darker than the reference value Cb, and keeps the outside image gradient ratio at the maximum ratio R2max. As a result, the multiple images in which the display objectives differ can be appropriately displayed to attain each objective.

5 Claims, 14 Drawing Sheets

| COLOR | GRADIENT RATIO | | | | | |
|---|---|---|---|---|---|---|
| | 100% | | | 50% | | |
| | SUB PIXEL GRADIENT LEVEL | | | SUB PIXEL GRADIENT LEVEL | | |
| | R | G | B | R | G | B |
| RED | 63 | 0 | 0 | 31 | 0 | 0 |
| GREEN | 0 | 63 | 0 | 0 | 31 | 0 |
| BLUE | 0 | 0 | 63 | 0 | 0 | 31 |
| YELLOW | 63 | 31 | 0 | 31 | 15 | 0 |
| WHITE | 63 | 63 | 63 | 31 | 31 | 31 |

DISPLAY DEVICE FOR VEHICLE

CROSS REFERENCE TO RELATED APPLICATION

This application is based on Japanese Patent Application No. 2008-191406 filed on Jul. 24, 2008, the contents of which are incorporated herein by reference in its entirety.

TECHNICAL FIELD

The present invention relates to a vehicle display device including a liquid crystal display panel and a light source for the liquid crystal display panel.

BACKGROUND

Conventionally, a display device for a vehicle etc. is known. The display device has a liquid crystal display panel for displaying an image, and a light source for illuminating the liquid crystal display panel. The liquid crystal display panel may be called an LCD. It is also known that a gradient level of a pixel on the LCD and a source luminance of the light source are variable, and are adjusted in accordance with an adjust value for adjusting a brightness or luminance of a displayed image.

For example, a display device disclosed in the patent document 1 holds a gradient level of an LCD and varies a source luminance of a light source, when a user set value which acts as an adjust value is brighter than a predetermined value. Contrary, the device holds the source luminance and varies the gradient level of the LCD, when the user set value is darker than the predetermined value. The device enables an image luminance to be varied over a wide range in accordance with the user set value. In detail, the device enables to vary the image luminance to be varied by a variable control of the gradient level in a range where an adjustment of the image luminance is difficult by the source luminance alone. As a result, it is possible to realize a legible image display which better fits the user's preference.
Patent document 1: JP-H11-194736-A

SUMMARY

A display device for a vehicle among several display devices is used not only under a bright environment of outside illumination, but also under a dark environment of outside illumination such as in a night time drive, in a dark place drive, etc. Therefore, in a dark environment of outside illumination, it is possible to improve visibility of an image by reducing image luminance on the LCD by changing a gradient level of the LCD while keeping a source luminance of a light source according to the above-mentioned patent document 1. However, as to images for calling a vehicle occupant's attention, such as an outside image provided by capturing a vehicle outside that needs attention, or a warning image which warns of vehicle abnormalities that need attention, it is necessary to keep the fundamental objective of displaying such an image by securing a certain amount of luminance. Therefore, if the gradient level of the LCD is changed according to the above-mentioned patent document 1, the image which shall be illuminated with a bright luminance is also darkly displayed. This may cause a problem that the darkened image can not perform the fundamental objective.

It is an object of the present exemplary embodiment to provide a display device for a vehicle which displays a plurality of images having different objectives appropriately in accordance with a corresponding objective of each of the images.

A first aspect of the present exemplary embodiment is a display device for a vehicle that has the following elements: an LCD for displaying an image in a vehicle; a light source for illuminating the LCD by producing luminescence; and a control device which controls the LCD and the light source in accordance with an adjust value for adjusting the luminance of the display image on the LCD, wherein the LCD has a first pixel for displaying a specific image at a specific time, and a second pixel for displaying a regular image at both the specific time and a regular time where the specific image is not displayed by the first pixel, and wherein the control device controls a gradient ratio of the first pixel which is obtained by a ratio of a gradient level of the first pixel to a preset gradient level of the first pixel, and controls a gradient ratio of the second pixel which is obtained by a ratio of a gradient level of the second pixel to a preset gradient level of the second pixel, and wherein the control device selectively performs a first mode and a second mode, and wherein the control device varies a source luminance of the light source according to the adjust value brighter than a reference value while keeping the gradient ratio of both the first pixel and the second pixel at the maximum ratio in the first mode, and wherein the control device varies the gradient ratio of the second pixel according to the adjust value darker than the reference value while keeping the source luminance of the light source at the minimum source luminance and keeps the gradient ratio of the first pixel at the maximum ratio in the second mode.

According to the exemplary embodiment, when the adjust value for adjusting the luminance of the display image on the LCD is in a range brighter than the reference value, the first mode is performed. Therefore, both the gradient ratios of the first pixel and the second pixel are kept at the maximum ratios, but the source luminance of the light source is varied according to the adjust value. As a result, it is possible to correctly adjust both the luminance of the specific image and the luminance of the regular image respectively displayed on the first pixel and the second pixel by the source luminance of the light source until the luminance corresponding to the reference value. On the other hand, when the adjust value is in a range darker than the reference value, the second mode is performed. The source luminance of the light source is kept at the minimum source luminance. Under this condition, the gradient ratio of the second pixel is varied according to the adjust value, and, but, the gradient ratio of the first pixel is kept at the maximum ratio. As a result, it is possible to keep and maintain the luminance of the specific image displayed on the first pixel at the luminance corresponding to the reference value by keeping and maintaining both the source luminance of the light source and the gradient ratio of the first pixel, simultaneously suppressing the luminance of the regular image displayed on the second pixel by varying the gradient ratio of the second pixel. As mentioned above, the device allows a user to adjust the luminance of the regular image which is displayed at both the regular time and the specific time to a luminance that can provide a good visibility suitable for a taste of a vehicle occupant. On the other hand, the device can secure the luminance necessary for achieving the fundamental objective of the specific image displayed at the specific time.

In a second aspect of the exemplary embodiment, the reference value is an adjust value corresponding to a luminance that is at least necessary for displaying the specific image. According to the exemplary embodiment, even if the adjust value becomes in a range darker than the reference value, it is possible to securely achieve a displaying objective of the specific image at the specific time, since the luminance of the specific image can be securely kept at least at the luminance corresponding to the reference value, i.e., the luminance at least necessary for displaying the specific image. In addition, in a case where the adjust value is in a range brighter than the reference value, it is possible to decrease the luminance of the specific image to at least necessary minimum luminance. Therefore, it is possible to extend a variable range of the luminance of the specific image as wide as possible. Therefore, it is possible to improve an adaptability of the luminance to the vehicle occupant's taste.

In a third aspect of the exemplary embodiment, the control device controls the source luminance of the light source to the minimum source luminance, when the adjust value is equal to the reference value in the first mode, and controls the gradient ratio of the second pixel to the maximum ratio when the adjust value is equal to the reference value in the second mode. According to the exemplary embodiment, when the adjust value is equal to the reference value in the first mode where the source luminance of the light source is controlled variable, the control device controls the source luminance of the light source to the minimum source luminance which is continuously provided during the adjust value is in a range darker than the reference value in the second mode. Therefore, no change is generated on the source luminance of the light source when switching the control modes. In addition, when the adjust value is equal to the reference value in the second mode where the gradient ratio of the second pixel is controlled variable, the control device controls the gradient ratio of the second pixel to the maximum ratio which is continuously provided during the adjust value is in a range brighter than the reference value in the first mode. Therefore, no change of the gradient ratio of the second pixel is generated when switching the control modes. In addition, regarding the gradient ratio of the first pixel which is kept at the maximum ratio in both the first and second modes, no change is generated when switching the control modes. As a result, the luminance of the specific image and the regular image respectively displayed on the first pixel and the second pixel can be smoothly adjusted by avoiding a sudden change of the luminance responsive to a switching of the modes of control at the reference value which functions as a boundary. Therefore, it is possible to avoid a situation where a vehicle occupant might get a feeling of wrongness.

According to a fourth aspect of the exemplary embodiment, the following configuration is provided. The specific image includes an outside image which is provided by capturing an external view at a specific time. The specific time is a time at which it is considered necessary to call attention to the external environment of the vehicle. The regular image includes a meter image which usually shows a condition indicative value of the vehicle at both the regular time and the specific time. According to this, a priority is given to a visibility of the meter image displayed as the regular image by always displaying it with the luminance which suited the vehicle occupant's taste. On the other hand, a displaying objective, which is to call attention to the external environment of the vehicle, for displaying the outside image as the specific image can be attained and satisfied by securing the luminance of the outside image at a value corresponding to the reference value.

According to a fifth aspect of the exemplary embodiment, the specific image includes a warning image for warning an abnormality at the specific time at which an abnormality is generated on the vehicle, and the regular image includes a meter image which shows a condition indicative value of the vehicle in both the regular time and the specific time. According to this, a priority is given to a visibility of the meter image displayed as the regular image by always displaying with the luminance which suited the vehicle occupant's taste. On the other hand, a displaying objective, which is to call attention to the abnormality of the vehicle, for displaying the warning image as the specific image can be attained and satisfied by securing the luminance of the outside image at a value corresponding to the reference value.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereinafter, an embodiment of the present invention is described in detail while using attached drawings.

First Embodiment

Figure 2:
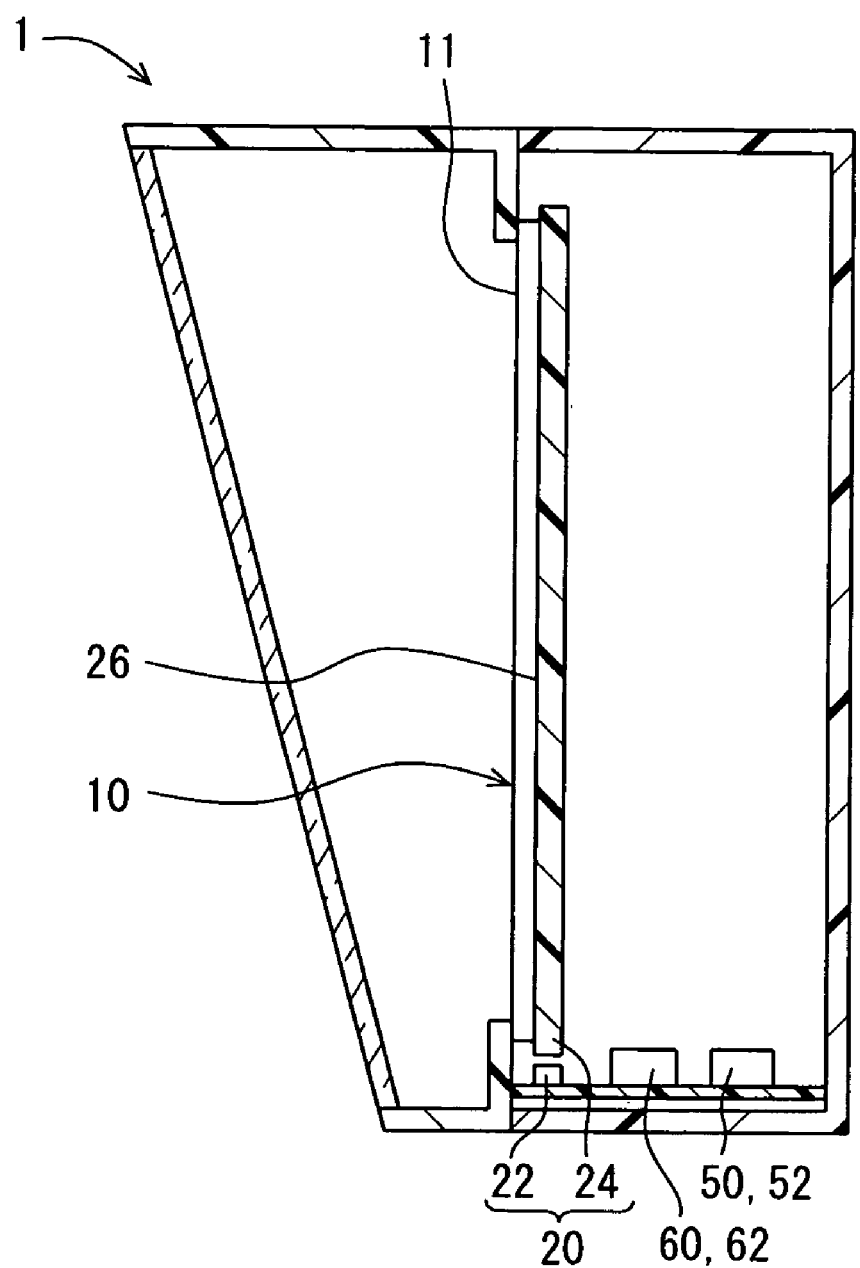
FIG. 2 is a cross sectional view along a II-II line in FIG. 3 showing a vehicle display device according to the first embodiment of the invention.
Figure 3:
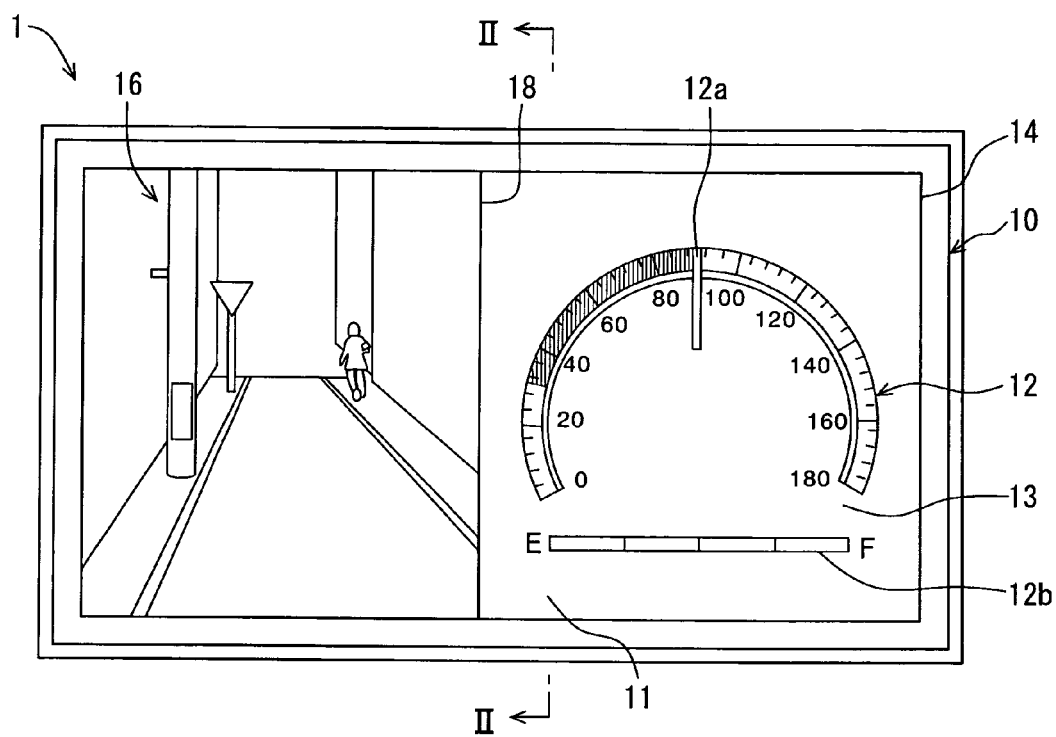
FIG. 3 is a frontal view of the vehicle display device showing a displayed image at a specific time according to the first embodiment of the invention.
Figure 4:
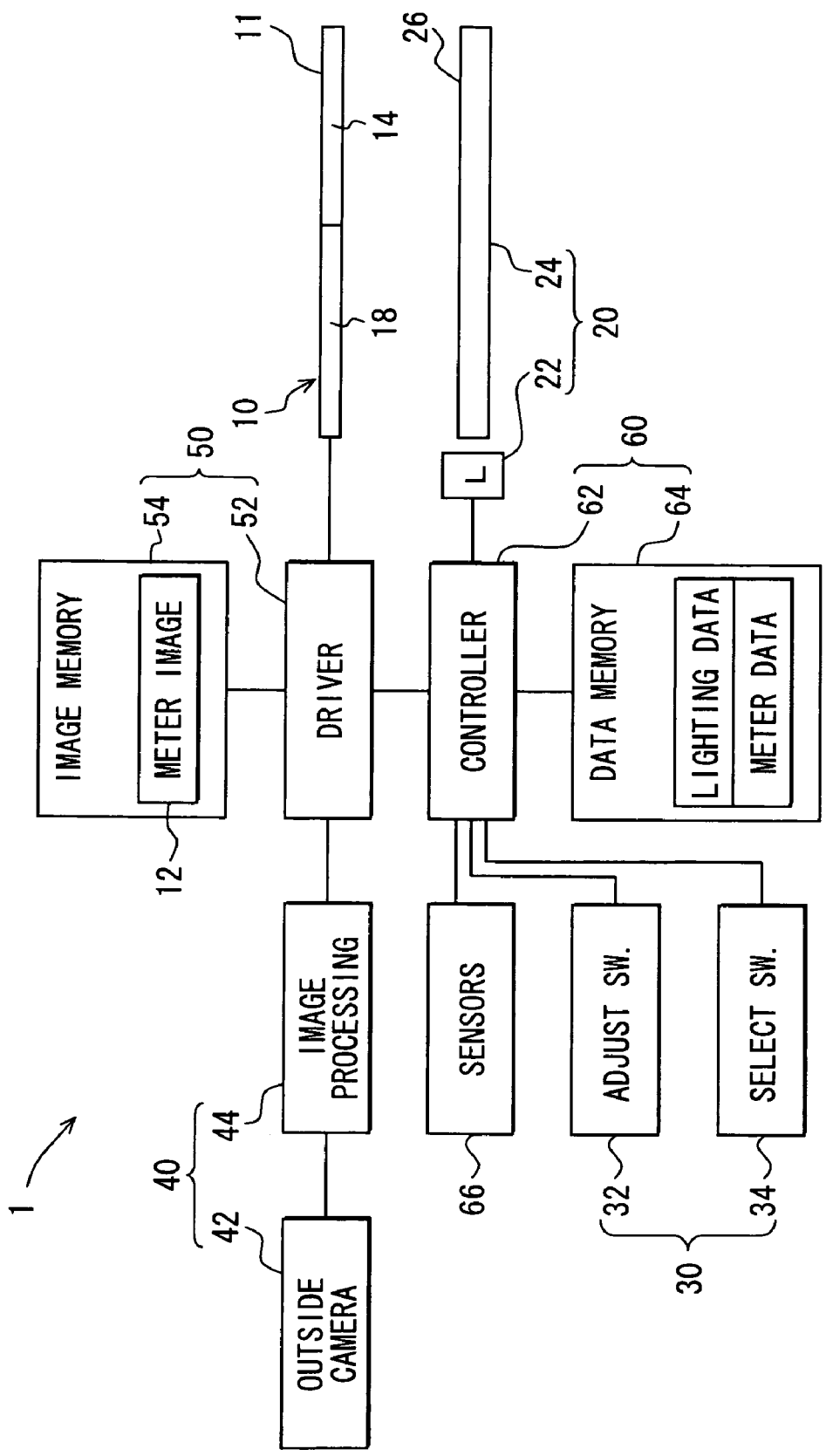
FIG. 4 is a block diagram showing a configuration of the vehicle display device according to the first embodiment of the invention.

FIGS. 2 and 3 show schematic configuration of the vehicle display device 1 according to a first embodiment of the invention. FIG. 4 shows an electric circuit configuration of the device 1.

As shown in FIGS. 2-4, the vehicle display device 1 is a device for functioning as a combination meter. The device 1 comprises an LCD 10, a liquid crystal display, a light source 20, an input portion 30, an image capturing portion 40, an LCD driver portion 50, and a display controller portion 60, etc.

The LCD 10 is a TFT penetration LCD. The LCD 10 is installed in front of the driver's seat in a manner that a screen 11 faces to a driver's seat in the vehicle. The LCD 10 is a dot-matrix type which has a plurality of pixels arranged in a matrix form. The LCD 10 displays a full color image on the screen 11 by driving these pixels, respectively. In this embodiment, one pixel of the LCD 10 contains three-colored sub-pixels R, G and B which have a red, a green and a blue color filter respectively. Then, the device is configured so that a display command signal, which directs gradient levels for the sub-pixels for every pixel, is supplied to the LCD driver portion 50 driving the LCD 10.

Figures 5, 6:
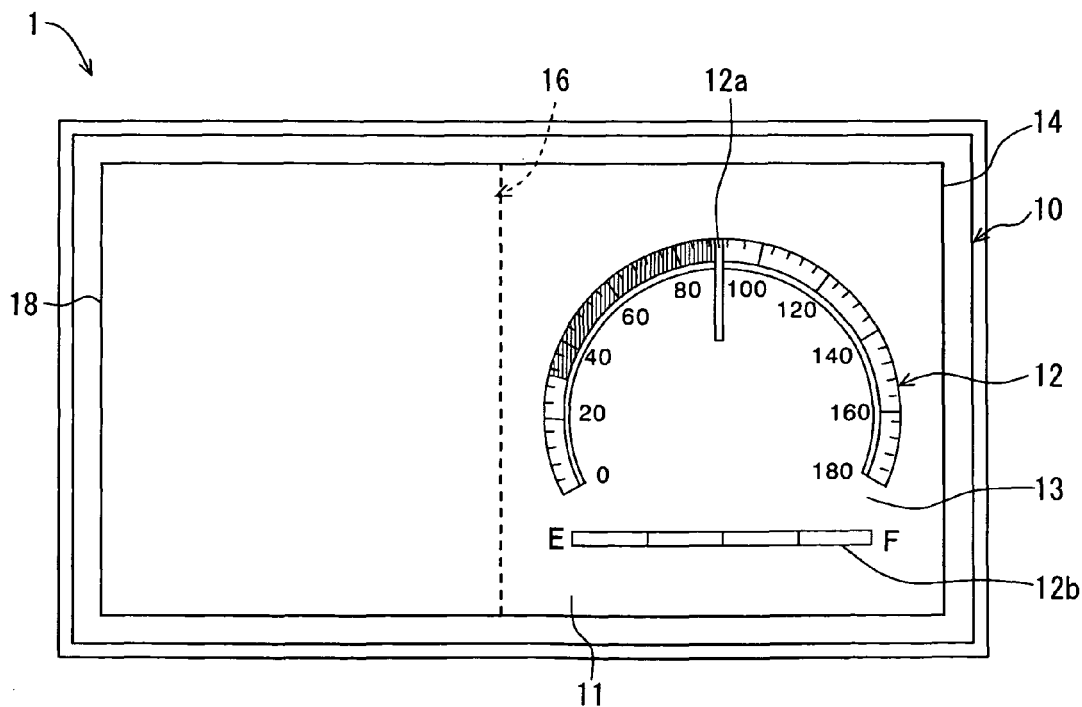
FIG. 5 is a characteristic graph showing a gradient ratio of a pixel according to the first embodiment of the invention.
FIG. 6 is a frontal view of the vehicle display device showing a displayed image at a regular time according to the first embodiment of the invention.

For example, as shown in FIG. 5, sub-pixels necessary for creating an indicated color on one pixel is predetermined. For example, in order to make one pixel into red, a sub-pixel R is commanded with 63 of the gradient level or 31 of the gradient level.

Furthermore, in order to give a difference of the concentration of the color to one pixel, different gradient levels according to required concentrations are commanded to the sub-pixel. For example, in order to make it deep red, the sub-pixel R is commanded with 63 of the gradient level. For example, in order to make it thin red, the sub-pixel R is commanded with 31 of the gradient level. Here, gradient levels given to the sub-pixel are larger than zero, and are in ranges below predetermined preset gradient levels respectively. The preset gradient levels are different for every color required for the pixel, and for every sub-pixel. A ratio of a commanded gradient level to the preset gradient level may be called as a gradient ratio. The gradient ratio is determined according to a concentration required.

In a case that there is a plurality of sub-pixels necessary for displaying color, it is important to keep and maintain color by setting gradient ratios for the sub-pixels in an identical ratio. Thereby, it is possible to avoid a misunderstanding of a display, because a display becomes legible for the vehicle occupants by keeping and maintaining color.

In this embodiment, the LCD driver portion 50 is supplied a display command signal that commands the LCD driver portion 50 to select a certain number for the gradient level for the sub-pixels necessary for displaying color to realize the gradient ratio determined as mentioned above, and to select zero for the gradient level for the sub-pixels remaining. In the following description, in order to explain plainly, the gradient ratio for the sub-pixel means the gradient ratio for the sub-pixel necessary for displaying color out of the sub-pixels constructing one of the pixels.

Here, any numerical value can be used as the preset gradient level used as a reference of the gradient ratio. For example, in a case that a table having 64 steps of the gradient level, including 0 to 63, as shown in FIG. 5 is memorized in an image memory 54 in the LCD driver portion 50, it is possible to choose a proper numerical value out of the 64 steps of the gradient level, and to use it as the preset gradient level. In an example shown in FIG. 5, the preset gradient levels are predetermined. In detail, for displaying red color, the preset gradient level for the sub-pixel R that is necessary is 63. In detail, for displaying yellow color, the preset gradient level for the sub-pixel R that is necessary is 63, and the preset gradient level for the sub-pixel G that is necessary is 31. In detail, for displaying white color, the preset gradient level for the sub-pixel R that is necessary is 63, the preset gradient level for the sub-pixel G that is necessary is 63, and the preset gradient level for the sub-pixel R that is necessary is 63. Thus, the preset gradient level shows the maximum of the gradient level selectable. Therefore, the gradient ratio becomes 100%, the maximum ratio, when the preset gradient level is selected. Especially in the embodiment, the maximum ratio is a gradient ratio that is obtained when the luminance of an image becomes the maximum in a first mode which will be described later. The luminance of an image indicates the luminance on the surface of the LCD 10, and may be also called as brightness.

In addition, the preset gradient level may be set at other than 64 and zero, even if the 64 steps of the gradient levels were memorized in the image memory 54. For example, when displaying yellow as shown in FIG. 5, the preset gradient level for the sub-pixel G takes 31 at the maximum ratio 100%. Therefore, for changing the gradient ratio for the sub-pixel G to 50%, the device selects 15 for the gradient level for the sub-pixel G. According to the above, the preset gradient level for the sub-pixel R may be predetermined similarly. For example, for displaying red color, 31 may be obtained as the preset gradient level for the sub-pixel R necessary. In this case, the device selects 15 as the gradient level for the sub-pixel R for changing the gradient ratio of the sub-pixel R from the maximum ratio 100% to 50%.

As shown in FIG. 3, the LCD 10 has a first pixel region 14 which is made of a plurality of pixels and displays a meter image 12 and a background image 13, and a second pixel region 18 which is made of a plurality of pixels and displays an outside image 16.

In detail, the first pixel region 14 is located on a right half part in the screen 11 of the LCD 10. The device displays the meter image 12 and the background image 13 by driving and controlling the plurality of pixels forming the first pixel region 14. Since the meter image 12 is an image for displaying a condition indicative value of the vehicle to the vehicle occupant, the device is configured to display the meter image 12 at both a specific time shown in FIG. 3 and a regular time shown in FIG. 6. Especially in this embodiment, the meter image 12 contains a speed display image 12a in which a speed is displayed, and a remaining amount display image 12b in which a remaining amount of fuel is displayed. The background image 13 is an image for displaying the meter image 12 in a highlighted fashion. The device displays the background image 13 in both the specific time shown in FIG. 3 and the regular time shown in FIG. 6.

The second pixel region 18 is positioned on the left half part in the screen 11 of the LCD 10. The second pixel region 18 is located adjacent to the first pixel region 14. The device displays the outside image 16 by driving the pixel which constructs the second pixel region 18. Here, the outside image 16 is acquired in order to call attention to the external situation of the vehicle, and is provided to the occupants in the vehicle. The outside image 16 is an image obtained by capturing a predetermined region of the external view from the vehicle by the image capturing portion 40. The outside image 16 is displayed as shown in FIG. 3 at the specific time. The specific time is a time at which it is considered necessary to call attention of the occupants. However, as shown in FIG. 6, the outside image 16 is not displayed in a visible fashion at the regular time. The regular time is a time at which it is considered especially unnecessary to call attention of the occupants to the external environment. Especially in this embodiment, the outside image 16 is an image that may be called as a night, view image, for example. This kind of image is an image which is provided by capturing a forward region where the visible light of the head light of the vehicle can not reach, for example at the time of a night drive of the vehicle, or a dark place drive of the vehicle, etc. In this case, a night drive of the vehicle, or a dark place drive of the vehicle may be used as one condition for determining the specific time.

As shown in FIG. 2 and FIG. 4, the light source 20 is provided with a light emitting diode 22 and a diffuser 24. The light emitting diode 22 is a chip type, and is installed obliquely behind the LCD 10 on the vehicle. The light emitting diode 22 is electrically connected with the display controller portion 60, and emits light by being driven in accordance with a luminescence drive signal supplied from the controller portion 60. The diffuser 24 is formed in the shape of a plate by light transmissive resin, and is arranged behind the LCD 10 in a parallel manner. Incoming light from the light emitting diode 22 located adjacently is diffused by the diffuser, and is emitted from a luminescent surface 26 facing the LCD 10. Therefore, the diffuser 24 provides a uniform luminance on an entire area of the luminescent surface 26. By using the above configuration, the light source 20 illuminates the display image on the LCD 10 by working as a backlight which illuminates the whole of the LCD 10 from back by the light from the luminescent surface 26.

As shown in FIG. 4, the input portion 30 includes an adjust switch 32 for the liquid crystal display and a select switch 34 for selecting a display enabled or disabled.

The adjust switch 32 is installed around the LCD 10 for example, and is configured to be operated by the occupants in order to adjust the luminance of the display image on the LCD 10. The adjust switch 32 of this embodiment is configured to have stepwise or continuous operative positions corresponding to the adjust value defined in a stepwise or continuous manner with respect to the luminance of the display image on the LCD 10. Therefore, the occupants can operate the adjust switch 32 to a desired position and input the adjust value corresponding to the operated position. In this embodiment, a reference value Cb is set beforehand as one mean value of the adjust value inputted by the adjust switch 32. The reference value Cb is set for adjusting the luminance of the outside image 16 to a luminance B2min which is at least necessary to achieve the display purpose of the image.

The select switch 34 is installed around the LCD 10 for example, and is configured to be operated in ON or OFF by the occupants in order to enable a display of a predetermined image or disable a display of the predetermined image. A display image which is enabled or disabled by the select switch 34 of this embodiment is a display of the outside image 16 on the second pixel region 18 of the LCD 10. The occupants may operate the select switch 34 to an ON position at the specific time calling attention to the external environment. The occupants may operate the select switch 34 to an OFF position at the regular time not calling attention to the external environment. Therefore, the occupants can input an enabling command or a disabling command for a display of the outside image 16.

In this embodiment, the specific time is a time period which displays the specific image. The specific time is a part of a display providing period by the vehicle display device. The specific time is a time period at which both the following conditions are satisfied, (1) the outside image 16 is obtained, and (2) the display of the outside image 16 is enabled by select switch 34. The regular time is a time period which may contain the above-mentioned specific time. The regular time is a time period at which the meter image 12 is displayed. The regular time is all of the display providing period by the vehicle display device. The regular time may be understood as a time period at which the meter image 12 can be displayed in an effective manner.

The above-mentioned switches 32 and 34 are electrically connected with the display controller portion 60, and transmit signals indicative of input conditions corresponding to respective operative positions to the display controller portion 60.

The image capturing portion 40 is provided with an external camera 42 and an image processing circuit 44. The external camera 42 is a device for capturing an external region of the vehicle by an image sensor such as a CCD, etc. The external camera 42 of this embodiment, for example, is installed in a front bumper or a front grille of the vehicle. A forward side of the vehicle is illuminated by infrared light supplied by a specially provided lighting device or a head lamp of the vehicle. A reflected light of the supplied light is received and converted into an image signal by the image sensor. The image processing circuit 44 is made of a micro computer, and is installed in the vehicle. The image processing circuit 44 is electrically connected with the external camera 42. The image processing circuit 44 generates the outside image 16 of the forward side of the vehicle by processing the image signal from the external camera 42. As mentioned above, the image capturing portion 40 captures an image of a region where the visible light of the head light can not reach, and acquires the outside image 16 of the region.

As shown in FIG. 2 and FIG. 4, the LCD driver portion 50 includes a driver circuit 52 and an image memory 54. The driver circuit 52 is made of IC chips such as ASIC, etc., and is installed behind the light emitting diode 22 in the vehicle. The driver circuit 52 is electrically connected to the LCD 10 and the display controller portion 60. The image memory 54 is made of an EEPROM and is electrically connected with the driver circuit 52. Image information including the meter image 12, etc., are stored beforehand, for example before a shipment of the device 1 from a factory. The driver circuit 52 reads out a predetermined one of the meter image 12 from the image memory 54 in response to the display command signal from the display controller portion 60. The driver circuit 52 displays the meter image 12 and the background image 13 adapted for the meter image 12 on the screen 11 by driving each of the pixels composing the first pixel region 14 in accordance with the display command signal.

In addition, in the LCD driver portion 50 of this embodiment, the driver circuit 52 is electrically connected with the image processing circuit 44 of the image capturing portion 40. The driver circuit 52 reads out the outside image 16 from the image memory 54 in response to the display command signal from the display controller portion 60. The driver circuit 52 displays the outside image 16 on the screen 11 by driving each of the pixels composing the second pixel region 18 in accordance with the display command signal.

The display controller portion 60 includes a controller circuit 62 and a data memory 64 as a storage device. The display controller portion 60 is made of a micro computer, and is installed behind the light emitting diode 22 in the vehicle. The controller circuit 62 is electrically connected with the light emitting diode 22 in the light source 20, each switches 32 and 36 in the input portion 30, the driver circuit 52, in the LCD driver portion 50, and sensors 66. The sensors 66 may be also called as sensors. The sensors 66 may include one or more sensors. The sensors 66 provides a means for detecting a vehicle condition indicative value which may be displayed as the meter image 12 on the first pixel region 14 on the LCD 10, and for transmitting a signal indicative of the detected result to the controller circuit 62. For example, the vehicle condition indicative value includes a vehicle speed, remaining fuel amount, etc.

The data memory 64 includes, for example, an EEPROM, a ROM, etc., and is electrically connected with the controller circuit 62. Two kinds of control information are memorized in data memory 64 beforehand, such as before a shipment of the device 1 from a factory etc. Since the data memory 64 memorizes the control information for controlling the LCD 10 and the light source 20, it is also called as a control information memory.

Figure 7:
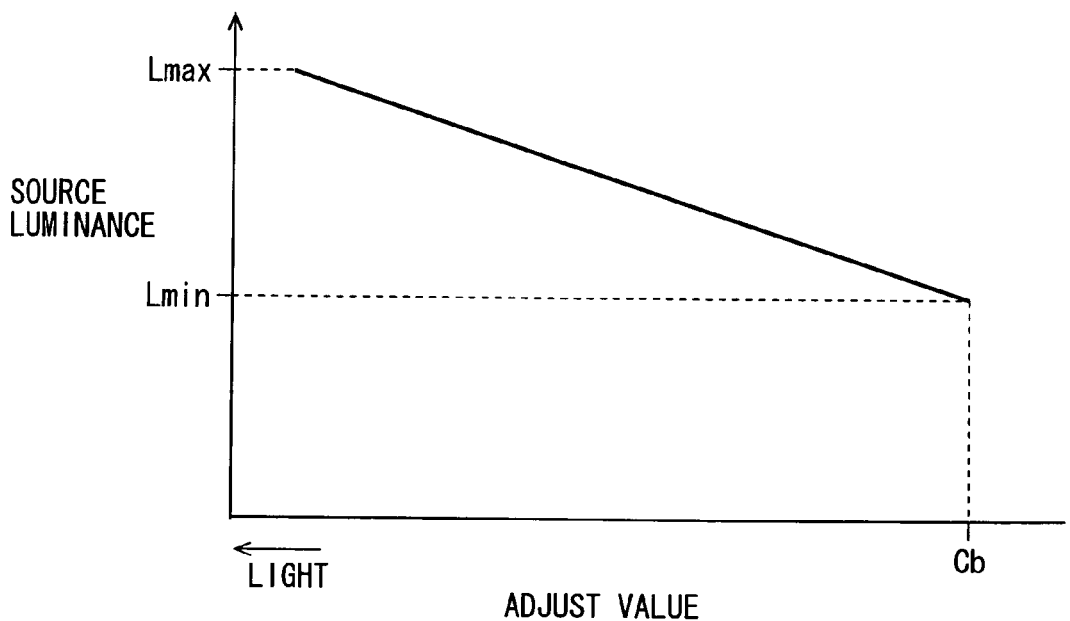
FIG. 7 is a graph showing the source luminance of the light source according to the first embodiment of the invention.

As shown in FIG. 7, a light source data shows a relationship between the luminance on the luminescent surface 26 of the light source 20 and the adjust value inputted by the adjust switch 32. Hereinafter, the luminance on the luminescent surface 26 may be called as a source luminance. The adjust value inputted by the adjust switch may be called as an input adjust value. Especially, the light source data of this embodiment is predetermined so that the source luminance of the light source 20 increases gradually from a minimum source luminance Lmin toward a maximum source luminance Lmax, as the input adjust value is varied from the reference value Cb to a brighter side. The relationship between the source luminance of the light source 20 and the input adjust value may take a logarithmic correlation, a step function, etc. instead of a linear correlation shown in FIG. 7. In addition, in case of any relationship, data format stored in the data memory 64 may be any format, such as a table format and a functional format.

Figure 8:
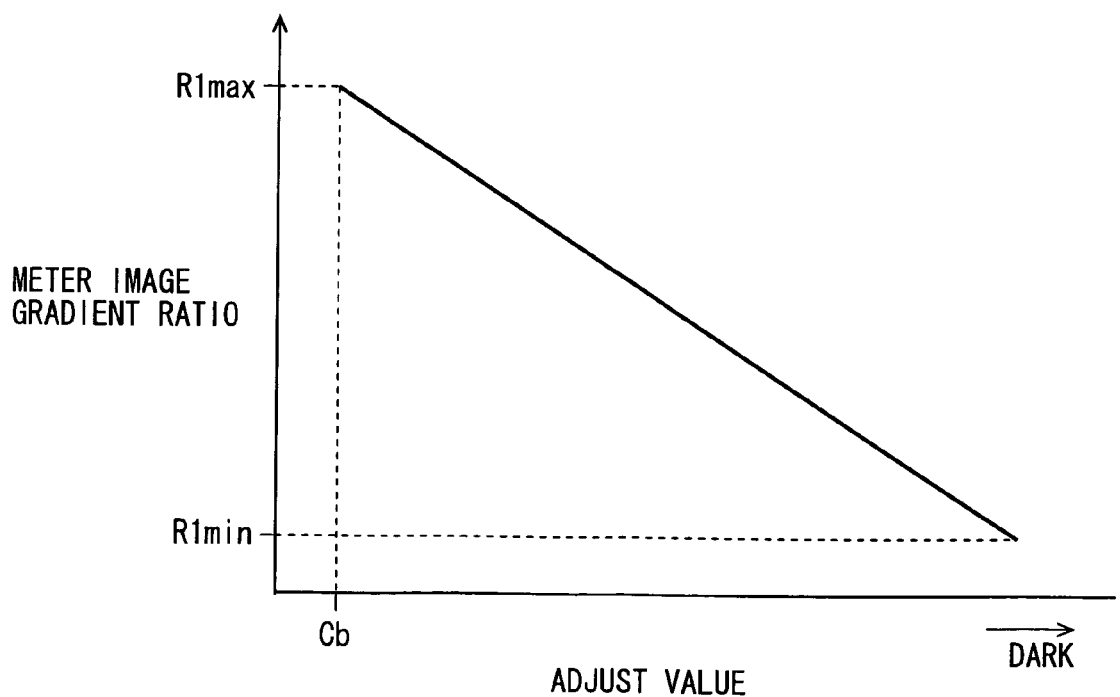
FIG. 8 is a graph showing the gradient ratio of the meter image according to the first embodiment of the invention.

As shown in FIG. 8, the meter data shows a relationship between the gradient ratio of the pixel which displays the meter image 12 on the first pixel region 14 and the input adjust value. Hereinafter, the gradient ratio of the pixel which displays the meter image 12 on the first pixel region 14 may be called as a meter image gradient ratio. The meter data may be called as meter control information. Especially, the meter data is predetermined so that the meter image gradient ratio decreases gradually from a maximum ratio R1max toward a minimum ratio R1min, as the input adjust value is varied from the reference value Cb to a darker side. The relationship between the meter image gradient ratio and the input adjust value may take a logarithmic correlation, a step function, etc. instead of a linear correlation shown in FIG. 8. In addition, in case of any relationship, data format stored in the data memory 64 may be any format, such as a table format and a functional format.

As mentioned above, the controller circuit 62 in FIG. 4 generates a luminescence driving signal based on the signal from each switches 32 and 34 and the sensors 66, and the light source data read from the data memory 64. The luminescence driving signal is a signal to control a driven condition of the light emitting diode 22 in the light source 20 by being supplied to the light emitting diode 22. Hereinafter, to supply the luminescence driving signal to the light emitting diode 22 is explained as to control the light source 20.

The controller circuit 62 generates the display command signal based on the signal from each of switches 32 and 34 and the sensors 66, and the meter data read from the data memory 64. The display command signal is a signal to control the driven condition of each pixel in the LCD 10 by being supplied to the driver circuit 52 in the LCD driver portion 50. Hereinafter, to supply the display command signal to the driver circuit 52 is explained as to control the LCD 10.

Figure 1A:
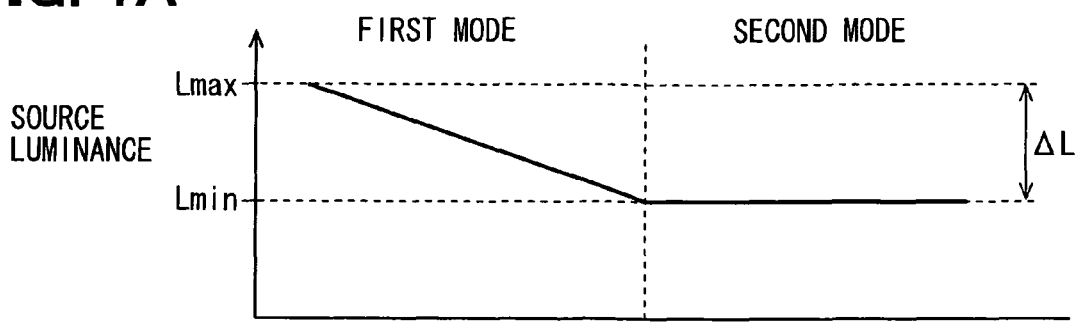
FIG. 1A is a graph showing a source luminance of a light source according to a first embodiment of the invention.
Figure 1B:
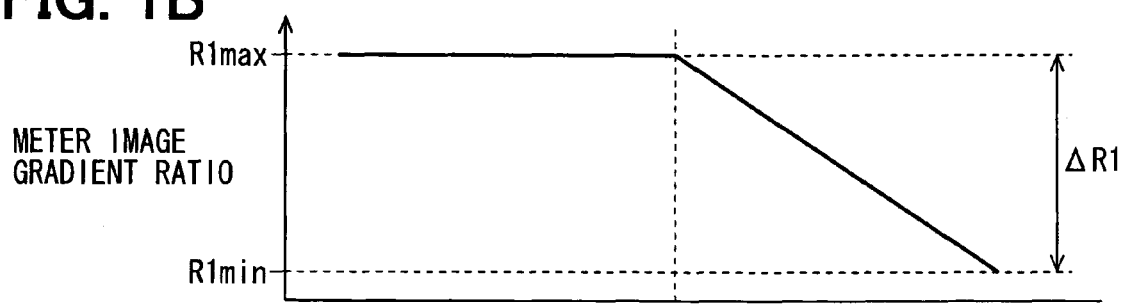
FIG. 1B is a graph showing a gradient ratio of a meter image according to the first embodiment of the invention.
Figure 1C:
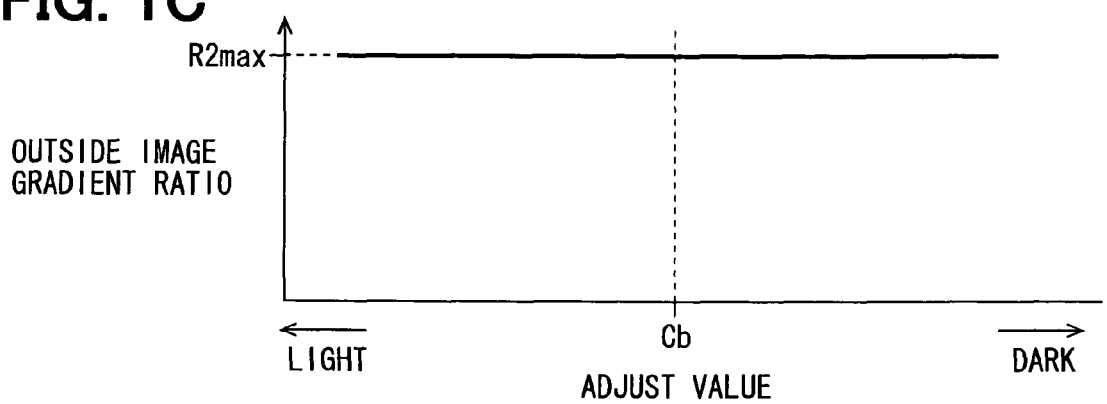
FIG. 1C is a graph showing a gradient ratio of an outside image according to the first embodiment of the invention.
Figure 9A:
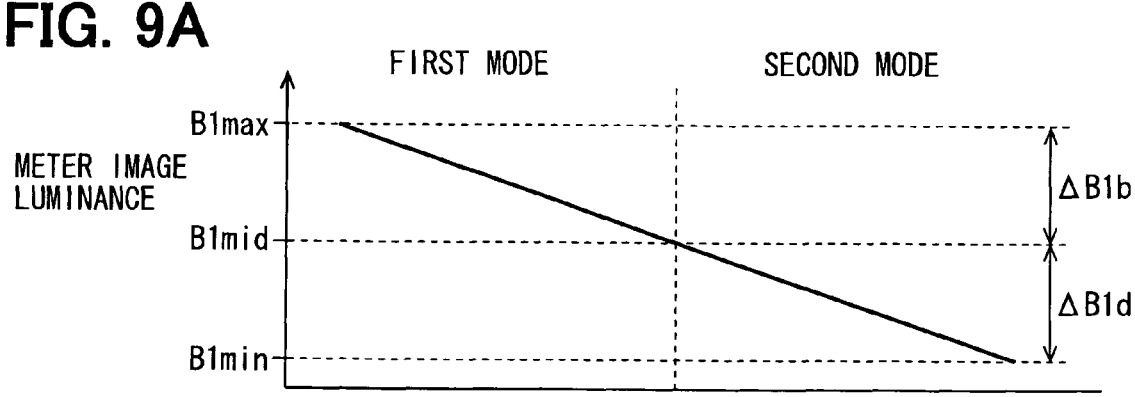
FIG. 9A is a graph showing a luminance of the meter image according to the first embodiment of the invention.
Figure 9B:
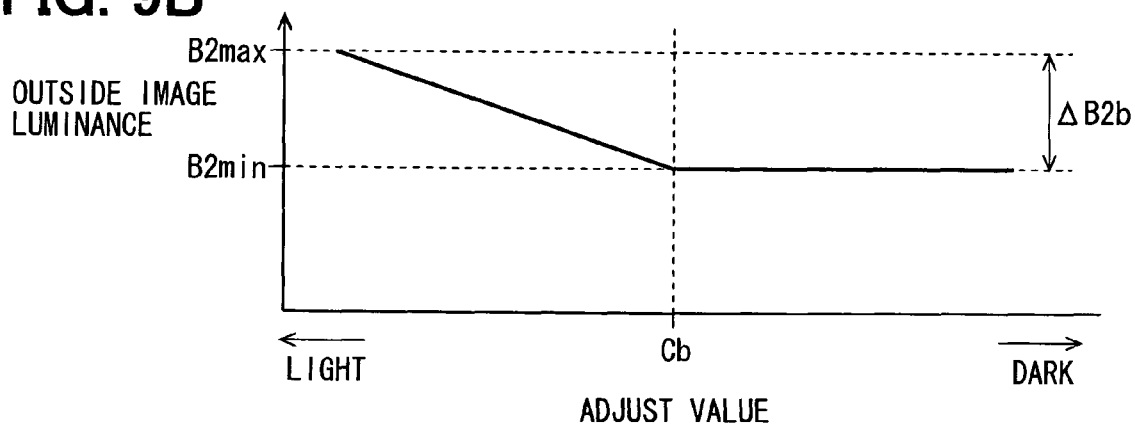
FIG. 9B is a graph showing a luminance of the outside image according to the first embodiment of the invention.

A display operation of the vehicle display device 1 in this first embodiment is explained referring to FIG. 1A, FIG. 1B, FIG. 1C, FIG. 9A, and FIG. 9B. FIG. 1A shows a source luminance of the light source 20. FIG. 1B shows a gradient ratio of the meter image in the first pixel region 14. FIG. 1C shows a gradient ratio of pixel which displays the outside image 16 in the second pixel region 18. Hereinafter, this gradient ratio may be referred to as an outside image gradient ratio. FIG. 9A shows a luminance of the meter image 12 displayed on the first pixel region 14. This luminance is a luminance on the surface of the LCD 10. FIG. 9B shows a luminance of the outside image 16 displayed on the second pixel region 18.

The controller circuit 62 of the display controller portion 60 switches control modes for controlling the light source 20 and the LCD 10 between a first mode and a second mode selectively according to a comparison result between the input adjust value indicated by the signal from the adjust switch 32 and the reference value Cb. In the following display operation and control flows in the first embodiment, a gradient ratio and a color tone of pixel for displaying the background image 13 on the first pixel region 14 for highlighting the meter image 12 are fixed irrespective of the control mode. Therefore, an explanation for the gradient ratio and the color tone of the pixel for the background image 13 is omitted below.

(1) First Mode

The controller circuit 62 performs the first mode, when the input adjust value is in a side brighter than the reference value Cb.

In the first mode, the controller circuit 62 controls the light source 20 irrespective of the signal from the select switch 34. As a result, the source luminance of the light source 20 is variable as shown in FIG. 1A. The source luminance of the light source 20 is obtained based on the light source data in the data memory 64. That is, the source luminance of the light source 20 in the first mode is variable within a variable range DeltaL between the maximum source luminance Lmax and the minimum source luminance Lmin. The source luminance of the light source 20 is controlled within the variable range DeltaL, and is controlled to a specific source luminance according to the input adjust value. Especially, when the input adjust value is equal to the reference value Cb, the source luminance of the light source 20 is controlled to the minimum source luminance Lmin that is the same in the second mode explained below in detail.

On the other hand, in the first mode, the controller circuit 62 controls the meter image gradient ratio of the first pixel region 14 on the LCD 10 to a fixed gradient ratio irrespective of the signal from the select switch 34. As a result, the meter image gradient ratio of the first pixel region 14 is kept at the fixed maximum ratio R1max as shown in FIG. 1B.

Therefore, on the first pixel region 14 at the first mode, a variable range DeltaB1b between a maximum luminance B1max and a middle luminance B1mid can be obtained only by varying the source luminance of the light source 20. As a result, as shown in FIG. 9A, the meter image 12 is displayed with a luminance set according to the input adjust value.

Further, in the first mode, the controller circuit 62 provides with the following control at the specific time at which the signal from the select switch 34 indicates an enablement of displaying the outside image 16. In above-mentioned specific time in the first mode, the controller circuit 62 controls the LCD 10. At this time, the controller circuit 62 keeps the outside image gradient ratio of the second pixel region 18 in the fixed maximum ratio R2max against a change of the input adjust value, as shown in FIG. 1C. Therefore, on the second pixel region 18 at the specific time in the first mode, a variable range DeltaB2b between a maximum luminance B2max and a minimum luminance B2min can be obtained only by varying the source luminance of the light source 20. As a result, as shown in FIG. 9B, the outside image 16 is displayed with a luminance set according to the input adjust value.

The controller circuit 62 controls a gradient ratio and a color tone of the second pixel region 18 of the LCD 10 so that the outside image 16 is dissolved into the background image 13 at the regular time at which the signal from the select switch 34 indicates a disablement of displaying the outside image 16 in the first mode. Therefore, at the regular time in the first mode, as shown in FIG. 6, the outside image 16 is not seemingly displayed on the second pixel region 18.

(2) Second Mode

The controller circuit 62 performs the second mode, when the input adjust value is in a side darker than the reference value Cb.

In the second mode, the controller circuit 62 keeps the source luminance to a fixed minimum source luminance Lmin against a change of the input adjust value by controlling the light source 20 irrespective of the signal from the select switch 34. As a result, as shown in FIG. 1A, the source luminance in the second mode is maintained constant.

In the second mode, the controller circuit 62 controls the LCD 10 irrespective of the signal from the select switch 34. At this time, the controller circuit 62 controls the meter image gradient ratio of the first pixel region 14 in a variable manner based on the meter data in the data memory 64. That is, as shown in FIG. 1B, the meter image gradient ratio of the first pixel region 14 in the second mode is made variable within the variable range DeltaR1 between the maximum ratio R1max and the minimum ratio R1min. As a result, the meter image gradient ratio of the first pixel region 14 in the second mode is controlled within the variable range DeltaR1 and is controlled to a gradient ratio set according to the input adjust value. Especially, if the input adjust value is equal to the reference value Cb, the meter image gradient ratio of the first pixel region 14 is controlled to the maximum ratio R1max which is the same as in the above-mentioned first mode. In the first pixel region 14 in the second mode, as shown in FIG. 9A, the variable range DeltaB1d between the middle luminance B1mid and the minimum luminance B1min can be obtained. As a result, as shown in FIG. 9A, the meter image 12 is displayed with a luminance set according to the input adjust value.

Further, in the second mode, the controller circuit 62 provides with the following control at the specific time at which the signal from the select switch 34 indicates an enablement of displaying the outside image 16. At the specific time in the second mode, the controller circuit 62 keeps the outside image gradient ratio of the second pixel region 18 in the fixed maximum ratio R2max against a change of the input adjust value by controlling the LCD 10. This control state is shown in FIG. 1C. Therefore, at the specific time in the second mode, both a display of the meter image 12 with variable luminance on the first pixel region 14 and a display of the outside image 16 with the minimum luminance B2min on the second pixel region 18 are simultaneously performed. This control state is shown by the right half part of FIG. 9A, and the right half part of FIG. 9B.

In addition, in the second mode, at the regular time at which the signal from the select switch 34 indicates a disablement of displaying the outside image 16, the controller circuit 62 controls the LCD 10 in a manner that is similar to a control at the regular time in the first mode mentioned above. Therefore, at the regular time in the second mode, the outside image 16 is not seemingly displayed on the second pixel region 18.

Figure 10:
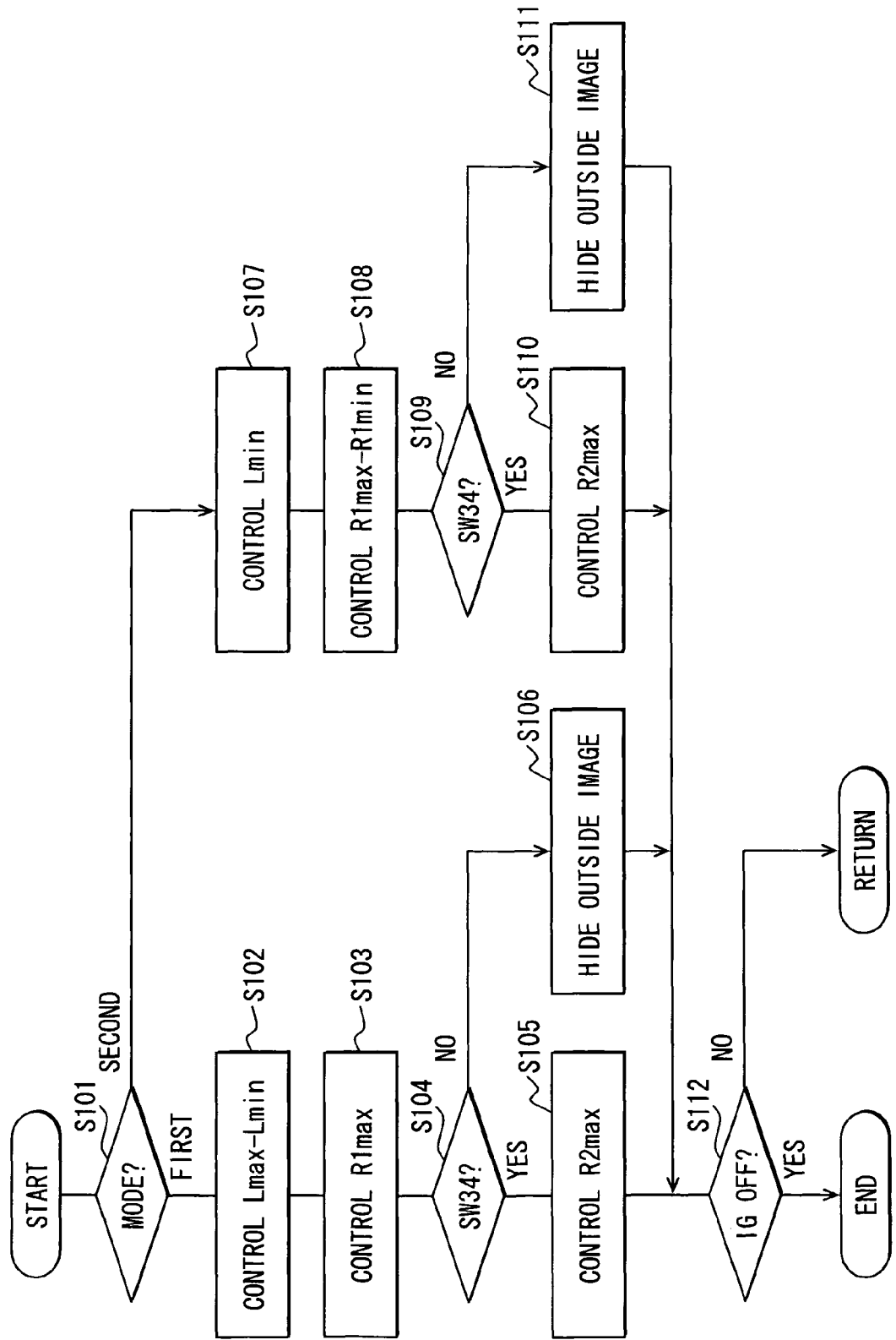
FIG. 10 is a flow chart showing a control flow according to the first embodiment of the invention.

A control flow by the controller circuit 62 in the first embodiment is explained referring to FIG. 10. The control flow in the second embodiment starts in response to an operation of the ignition switch of the vehicle.

In a step S101, the device sets the mode for controlling display to the first mode or the second mode selectively in accordance with the input adjust value which is indicated by the signal from the adjust switch 32.

If the control mode is set to the first mode in response to the input adjust value that is in a brighter side than the reference value Cb in the step S101, the routine proceeds to a step S102. In the step S102, the device controls the source luminance of the light source 20 in a variable manner in accordance with the input adjust value. The source luminance is variable within a range between the maximum source luminance Lmax and the minimum source luminance Lmin based on the light source data in the data memory 64.

Then, in a step S103, the device controls and keeps the meter image gradient ratio of the first pixel region 14 in the LCD 10 to the maximum ratio R1max. Thereby, the device displays the meter image 12 on the first pixel region 14 with a luminance that is within a range between the maximum luminance B1max and the middle luminance B1mid and corresponds to the input adjust value.

Further, in a step S104, command content indicated by the signal from the select switch 34 is determined. In accordance with the result of above, if the determined command is an enablement (YES) of display the outside image 16, the routine proceeds to a step S105. If the determined command is a disablement (NO) of display the outside image 16, the routine proceeds to a step S106.

In the step S105 responsive to the enablement command, the outside image gradient ratio of the second pixel region 18 in the LCD 10 is controlled and kept to the maximum ratio R2max. Thereby, the device displays the outside image 16 on the second pixel region 18 with a luminance that is within a range between the maximum luminance B2max and the minimum luminance B2min and corresponds to the input adjust value.

On the other hand, in the step S106 responsive to the disablement command, the outside image gradient ratio and the color tone of the second pixel region 18 in the LCD 10 are controlled and kept so that the outside image 16 is dissolved into the background image 13. Thereby, the device turns the outside image 16 into an invisible condition seemingly on the second pixel region 18. The device hides the outside image 16 from the driver's view by dissolving the outside image 16 into the background image 13.

As mentioned above, although the explanation was provided in a case where the first mode was set up as the control mode, if the control mode is set to the second mode in response to the input adjust value that is in a darker side than the reference value Cb in the step S101, the routine proceeds to a step S107. In the step S107, the source luminance of the light source 20 is controlled and kept to the minimum source luminance Lmin.

Then, in a step S108, the device controls the meter image gradient ratio of the first pixel region 14 in the LCD 10 in a variable manner in accordance with the input adjust value. The meter image gradient ratio is variable within a range between the maximum ratio R1max and the minimum ratio R1min based on the meter data in the data memory 64. Thereby, the device displays the meter image 12 on the first pixel region 14 with a luminance that is within a range between the minimum luminance B1min and the middle luminance B1mid and corresponds to the input adjust value.

Then, a determination similar to the above-mentioned step S104 is performed based on the signal from the select switch 34 in a step S109. If the enablement of display the outside image 16 is determined, the routine proceeds to a step S110. If the disablement of display the outside image 16 is determined, the routine proceeds to a step S111.

In the step S110 responsive to the enablement command, the outside image gradient ratio of the second pixel region 18 in the LCD 10 is controlled and kept to the maximum ratio R2max. As a result, the device displays the outside image 16 with the minimum luminance B2min on the second pixel region 18 irrespective of the meter image 12 displayed with a variable luminance on the first pixel region 14.

On the other hand, in the step S111 responsive to the disablement command, the outside image gradient ratio and the color tone of the second pixel region 18 in the LCD 10 are controlled and kept similar to the above-mentioned step S106 so that the outside image 16 is controlled in an invisible condition seemingly.

In the control flow, the routine proceeds to a step S112 after execution of each one of the step S105, S106, S110, and S111, and determines whether the ignition switch is turned off or not. If an affirmative determination is made, the device completes the control flow. But, if a negative determination is made, the device returns to the step S101 and continues the control flow.

According to the first embodiment described above, the luminance of the meter image 12 and the luminance of the outside image 16 are correctly adjusted by varying the source luminance of the light source 20, since the device performs the first mode during the input adjust value is in a side brighter than the reference value Cb. Further, if input adjust value becomes a side darker than the reference value Cb, the device performs the second mode. Therefore, the luminance of the meter image 12 is suppressed at a low level by varying the meter image gradient ratio. Simultaneously, the luminance of the outside image 16 is kept at a level B2min that is at least necessary by keeping the source luminance of the light source 20 and the outside image gradient ratio. According to the above, regarding the meter image 12, a priority is always given to the luminance that provides a good visibility and is suitable to the vehicle occupant's taste. In addition, regarding the outside image 16, it is possible to provide the luminance that is adjusted to be suitable to the vehicle occupant's taste within a range as wide as possible. In addition, regarding the outside image 16, it is possible to certainly attain a fundamental objective of calling attention to the external environment by keeping the minimum luminance.

According to the first embodiment, in a case where the input adjust value is equal to the reference value Cb in the first mode, the source luminance of the light source 20 is controlled to a keeping source luminance Lmin in the second mode, therefore no significant change of the source luminance is generated when switching the control modes. In a case where the input adjust value is equal to the reference value Cb in the second mode, the meter image gradient ratio is controlled to a keeping ratio R1max in the first mode, therefore no significant change of the gradient ratio is generated when switching the control modes. Further, regarding the gradient ratio of the first pixel which is kept at the maximum ratio in both the first and second modes, no significant change is generated when switching the control modes. According to the above, since both the luminance of the meter image 12 and the luminance of the outside image 16 can be adjusted smoothly, without making any sudden change depending on a switching of the control modes at a boundary on the reference value Cb, it is possible to avoid situation where the occupants of the vehicle feel a wrong feeling.

In addition, according to the first embodiment, since the source luminance of the light source 20 is made variable in the first mode, it is possible to keep it at a condition where the source luminance of the light source 20 is limited to the minimum in the second mode that is located on a darker side than the first mode. Therefore, in the LCD 10, it is possible to suppress a leakage of light in a part displaying a black color where a dark image is required. For example, the black color part is the background image 13. According to the first embodiment, since the meter image gradient ratio is made variable only on the second mode that is one of the control modes selected based on the input adjust value, it is possible to suppress a situation where a falling of color tone is caused by an excessive decrease of the meter image gradient ratio.

In the first embodiment, the display controller portion 60 is the control means, the meter image 12 is the regular image, one pixel or a plurality of pixels forming the first pixel region 14 is the second pixel, the outside image 16 is the specific image, and one pixel or a plurality of pixels forming the second pixel region 18 is the first pixel.

Second Embodiment

The second embodiment of the present invention is a modified embodiment of the first embodiment. In the following description, differences from the first embodiment are mainly described.

Figure 11:
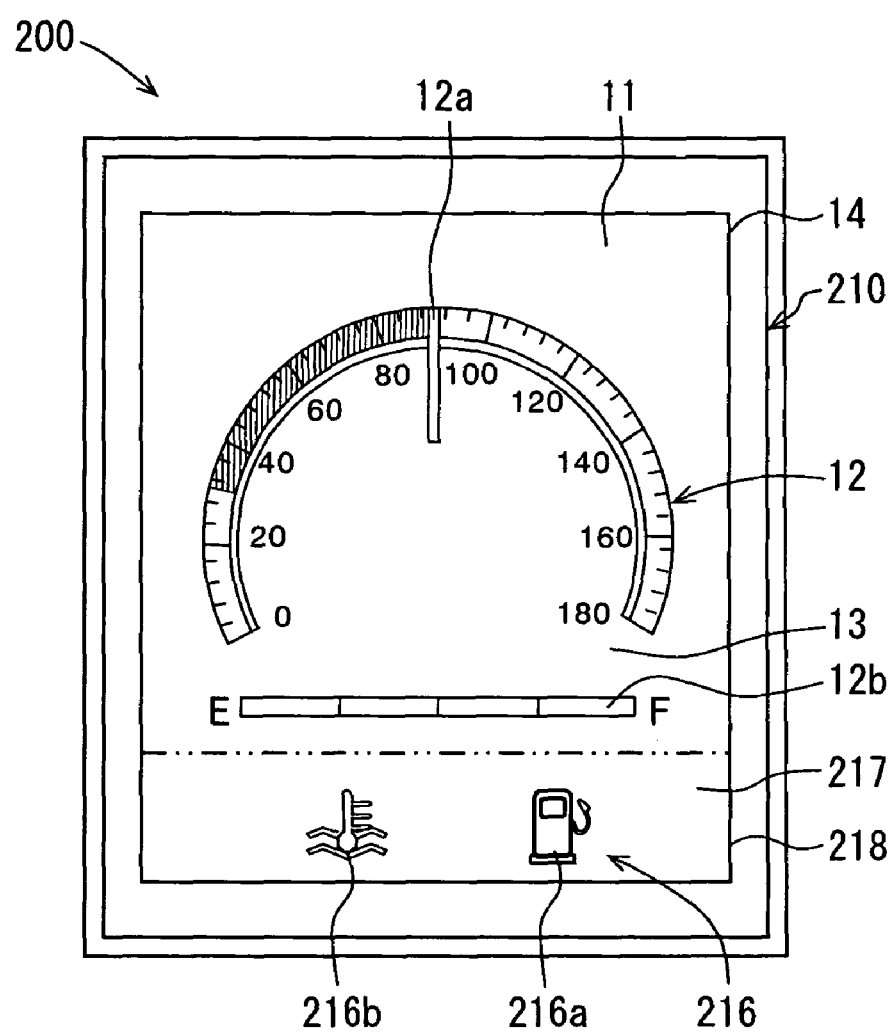
FIG. 11 is a frontal view of the vehicle display device showing a displayed image at a specific time according to the second embodiment of the invention.
Figure 12:
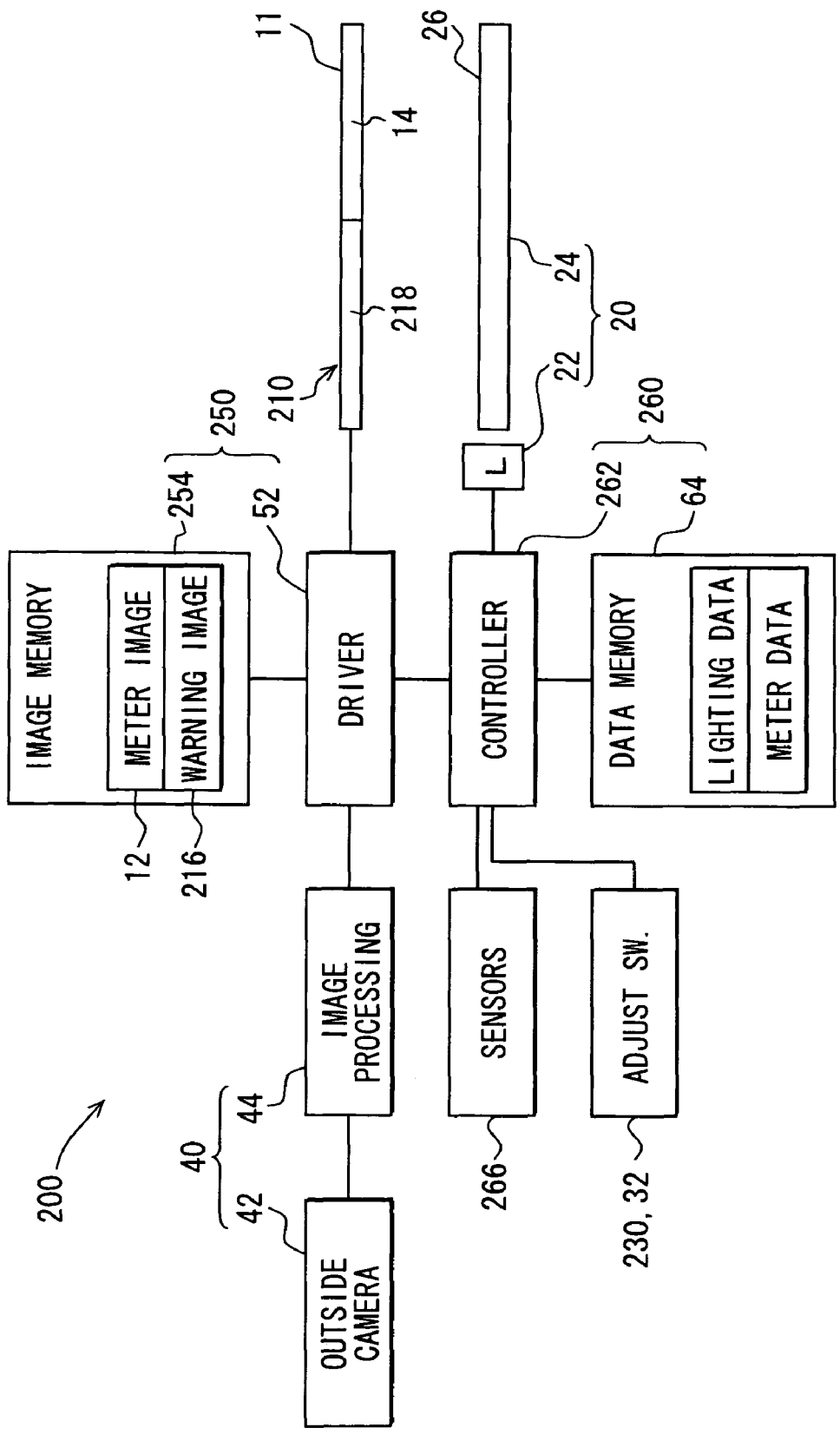
FIG. 12 is a block diagram showing a configuration of the vehicle display device according to the second embodiment of the invention.

As shown in FIG. 11 and FIG. 12, an LCD 210 of a vehicle display device 200 in the second embodiment is provided with a second pixel region 218 that displays an warning image 216 and a background image 217 by driving the composing pixels and is located below the first pixel region 14. In FIG. 11, the two-dash line virtually shows a boundary between the first pixel region 14 and the second pixel region 218.

Figure 13:
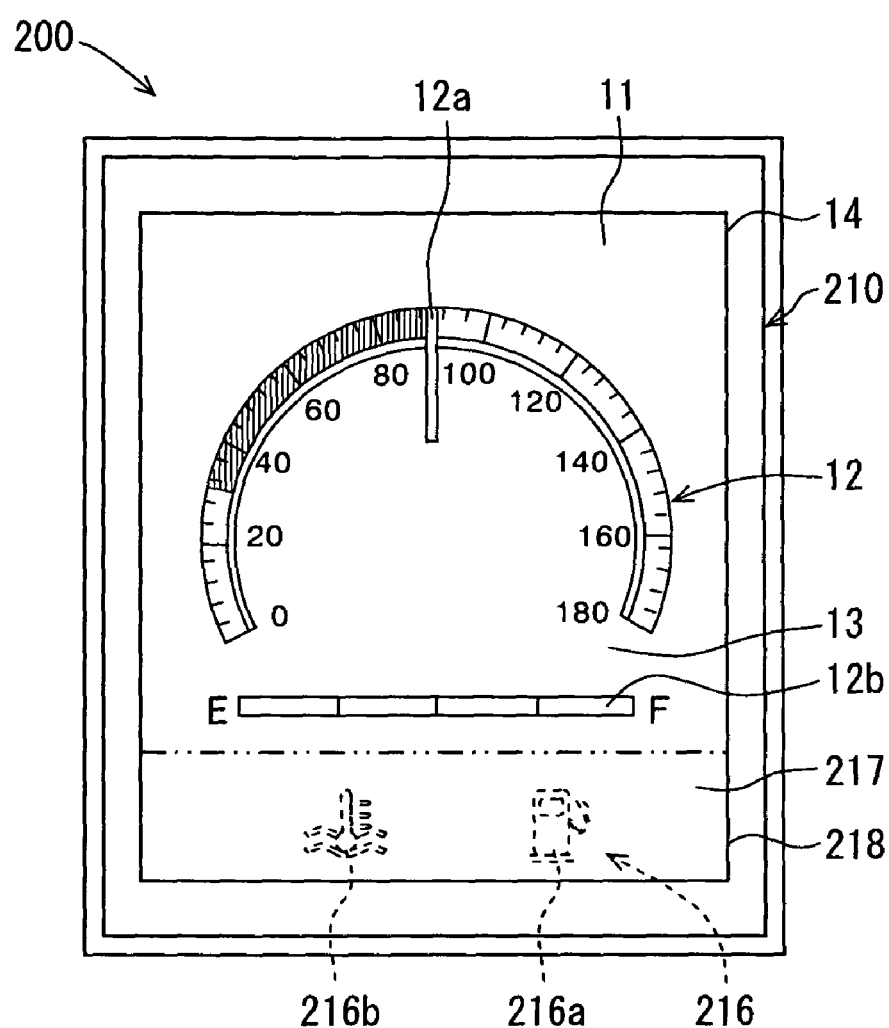
FIG. 13 is a frontal view of the vehicle display device showing a displayed image at a regular time according to the second embodiment of the invention.

Here, the warning image 216 is an image which warns of an abnormality in order to call attention to the abnormality occurred on the vehicle. Therefore, the device displays the warning image 216 at the specific time at which an abnormality occurs as shown in FIG. 11, but, does not seemingly display the warning image 216 at the regular time as shown in FIG. 13. Especially in this embodiment, the warning image 216 includes a fuel abnormal image 216a indicative of a fuel empty abnormality of empty condition of a remaining fuel, and a water temperature abnormal image 216b indicative of a temperature rise abnormality of excessive rise of a cooling water temperature. The background image 217 is an image for displaying the warning image 216 in a highlighted fashion. The device displays the background image 217 in both the specific time shown in FIG. 11 and the regular time shown in FIG. 13. In order to distinguish the background images 13 and 217 displayed in each pixel regions 14 and 218, the background image 13 for the first pixel region 14 is called a first background image 13, and the background image 217 for the second pixel region 218 is called a second background image 217.

As shown in FIG. 12, the select switch 34 is removed from the input portion 230 by employing the above modification. In addition, the image memory 254 in the LCD driver portion 250 beforehand stores the warning image 216 etc. in addition to the meter image 12 as the image information. The controller circuit 262 in the display controller portion 260 monitors the fuel empty abnormality and the temperature rise abnormality based on signals from the sensors 266 for detecting an amount of the remaining fuel and a temperature of the cooling water with the vehicle speed etc. The controller circuit 262 performs a control of the LCD 10 based on a monitoring result.

Figure 14A:
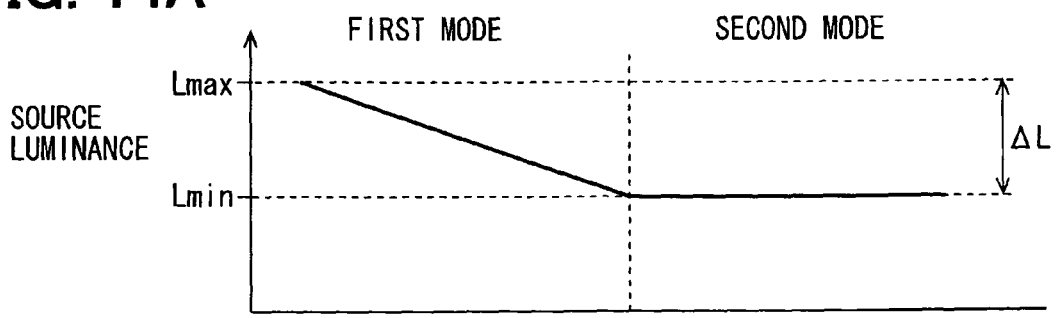
FIG. 14A is a graph showing a source luminance of a light source according to the second embodiment of the invention.
Figure 14B:
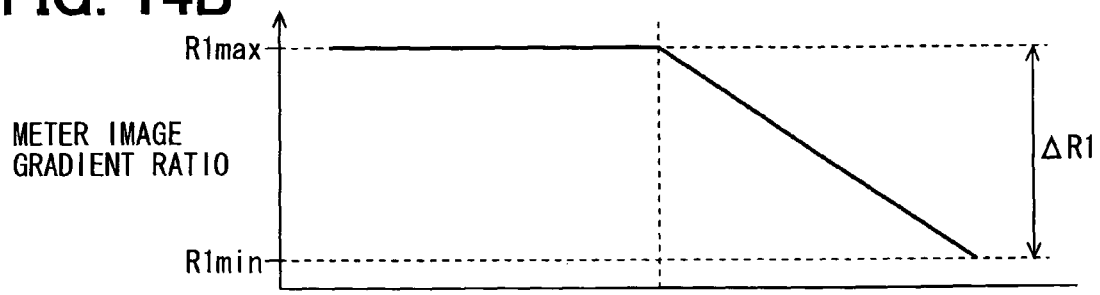
FIG. 14B is a graph showing a gradient ratio of a meter image according to the second embodiment of the invention.
Figure 14C:
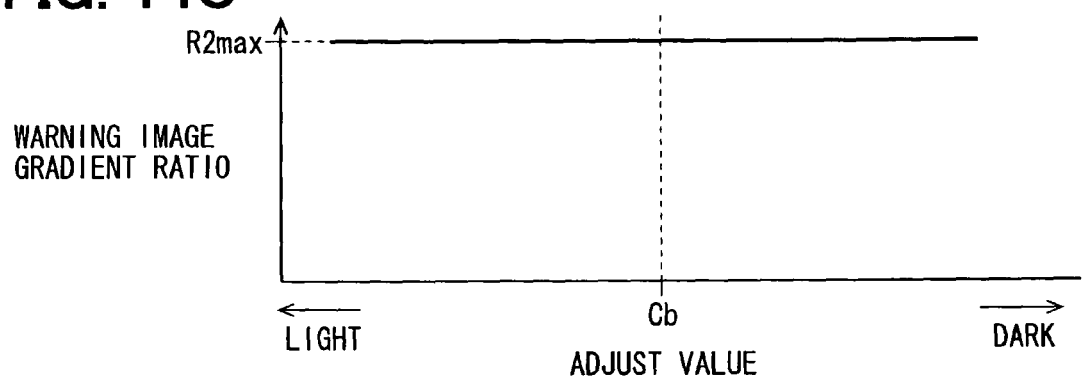
FIG. 14C is a graph showing a gradient ratio of an outside image according to the second embodiment of the invention.
Figure 15A:
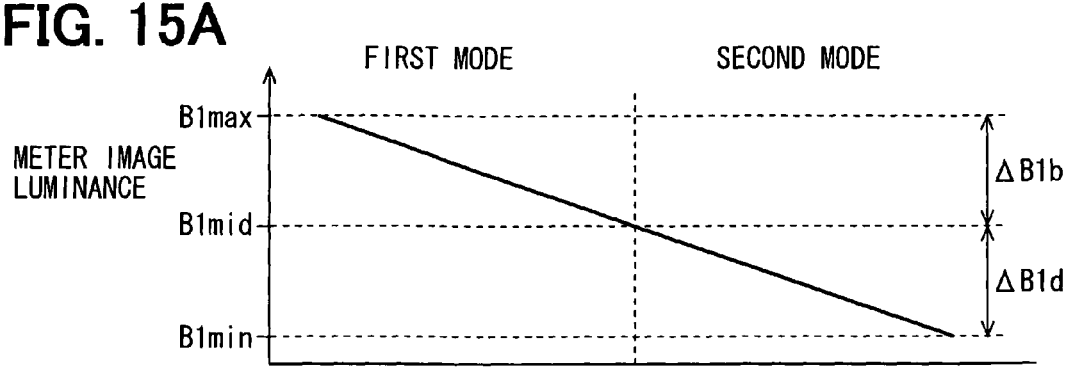
FIG. 15A is a graph showing a luminance of a meter image according to the second embodiment of the invention.
Figure 15B:
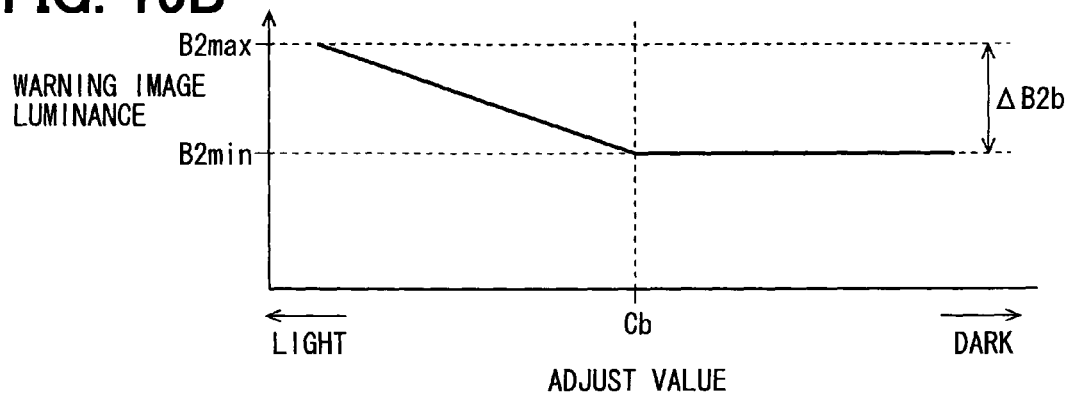
FIG. 15B is a graph showing a luminance of a warning image according to the second embodiment of the invention.

A display operation of the vehicle display device 200 in this second embodiment is explained referring to FIG. 14A, FIG. 14B, FIG. 14C, FIG. 15A, and FIG. 15B. FIG. 14A shows a source luminance of the light source 20. FIG. 14B shows a gradient ratio of the meter image in the first pixel region 14. FIG. 14C shows a gradient ratio of pixel which displays the warning image 216 in the second pixel region 218. Hereinafter, this gradient ratio may be referred to as a warning image gradient ratio. FIG. 15A shows a luminance of the meter image 12 displayed on the first pixel region 14. This luminance is a luminance on the surface of the LCD 10. FIG. 15B shows a luminance of the outside image 216 displayed on the second pixel region 218.

The controller circuit 262 in the display controller portion 260 switches control modes between a first mode and a second mode selectively according to a comparison result between the input adjust value and the reference value Cb. In the following display operation and control flows in the second embodiment, a gradient ratio and a color tone of pixel for displaying the background images 13 and 217 on the pixel regions 14 and 218 for highlighting the meter image 12 and the warning image 216 are fixed irrespective of the control mode. Therefore, an explanation for the gradient ratio and the color tone of the pixel for the background images 13 and 217 is omitted below.

(1) First Mode

In the first mode which is performed when the input adjust value is in a side brighter than the reference value Cb, the controller circuit 262 controls the source luminance of the light source 20 and the meter image gradient ratio on the first pixel region 14 in the LCD 210 in a similar way to the first mode in the first embodiment. This control characteristic is illustrated in FIG. 14A and FIG. 14B. The luminance illustrated in FIG. 15A is obtained by the above. As a result, a variable range of DeltaB1 between a maximum luminance B1max and a middle luminance B1mid is obtained. In the first pixel region 14, the meter image 12 is displayed with the luminance that is adjusted according to the adjust value inputted and is in the variable range DeltaB1b.

In addition, in the first mode, the controller circuit 262 controls and keeps a warning image gradient ratio on the second pixel region 218 in the LCD 210 to the maximum ratio R2max at the specific time. In the specific time, the signal from the sensors 266 indicates the fuel empty abnormality or the temperature rise abnormality. This control characteristic is illustrated in FIG. 14A, FIG. 14B, and FIG. 14C. The luminance shown in FIG. 15B is obtained by the above. A variable range DeltaB2b between a maximum luminance B2max and a middle luminance B2mid can be obtained by varying the source luminance of the light source 20 in a similar way to the first embodiment. In the second pixel region 218, the warning image 216 is displayed with the luminance that is adjusted according to the adjust value inputted and is in the variable range DeltaB2b.

The controller circuit 262 controls the outside image gradient ratio and the color tone of the second pixel region 218 on the LCD 10 so that the warning image 216 is dissolved into the second background image 217 at the regular time at which the signals from the sensors 266 do not indicate any abnormalities in the first mode. Therefore, at the regular time in the first mode, as shown in FIG. 13, the warning image 216 is not seemingly displayed on the second pixel region 218.

(2) Second Mode

In the second mode which is performed when the input adjust value is in a side darker than the reference value Cb, the controller circuit 262 controls the source luminance of the light source 20 and the meter image gradient ratio on the first pixel region 14 in the LCD 210 in a similar way to the second mode in the first embodiment. This control characteristic is illustrated in FIG. 14A and FIG. 14B. The luminance illustrated in FIG. 15A is obtained by the above. As a result, a variable range DeltaB1d between a middle luminance B1mid and a minimum luminance B1min is obtained. In the first pixel region 14, the meter image 12 is displayed with the luminance that is adjusted according to the adjust value inputted and is in the variable range DeltaB1d.

In addition, in the second mode, the controller circuit 262 controls and keeps a warning image gradient ratio on the second pixel region 218 in the LCD 210 to the maximum ratio R2max at the specific time. In the specific time, the signal from the sensors 266 indicates the fuel empty abnormality or the temperature rise abnormality. This control characteristic is illustrated in FIG. 14A, FIG. 14B, and FIG. 14C. The luminance illustrated in FIG. 15B is obtained by the above. Therefore, at the specific time in the second mode, both a display of the meter image 12 with variable luminance on the first pixel region 14 and a display of the warning image 216 with the minimum luminance B2min on the second pixel region 218 as shown in FIG. 15B are simultaneously performed.

At the regular time at which the signals from the sensors 266 do not indicate any abnormalities in the second mode, the LCD 210 is controlled in a similar manner as in the regular time in the first mode mentioned above, therefore, the warning image 216 is not seemingly displayed on the second pixel region 18.

Figure 16:
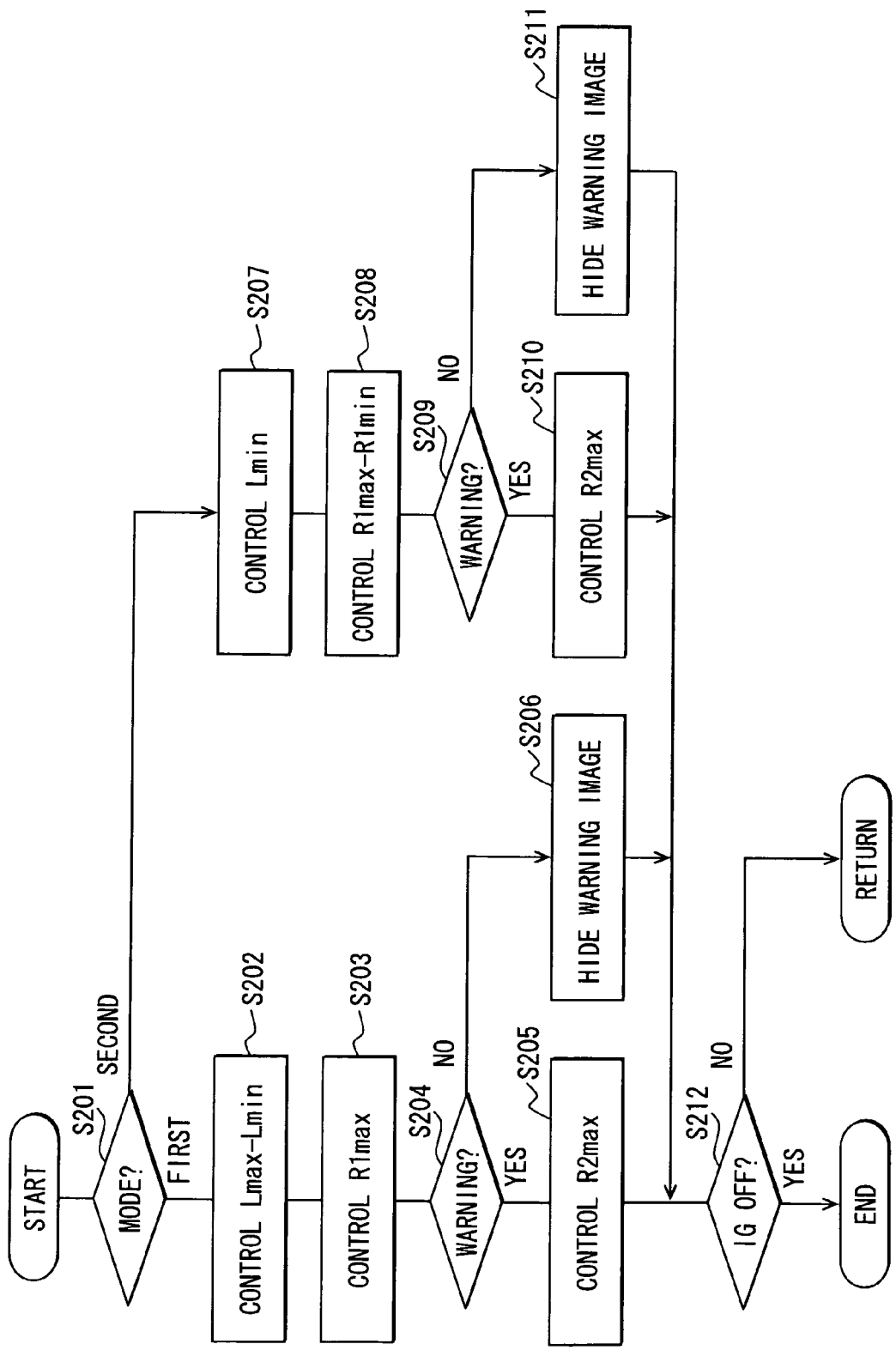
FIG. 16 is a flow chart showing a control flow according to the second embodiment of the invention.

A control flow by the controller circuit 262 in the second embodiment is explained referring to FIG. 16. The control flow in the second embodiment also starts in response to an operation of the ignition switch of the vehicle.

Similar to the step S101 in the first embodiment, a control mode is set up in a step S201. As a result, in a case that the control mode is set to the first mode in response to the input adjust value in a side brighter than the reference value Cb, steps S202 and S203 similar to the step S102 and S103 in the first embodiment are performed. Then, the routine proceeds to a step S204.

In the step S204, it is determined that whether or not the signals from the sensors 266 indicate one of the fuel empty abnormality and the temperature rise abnormality. If the signal indicates one of the abnormalities, the routine proceeds to a step S205. If the signal indicates neither of the abnormalities, the routine proceeds to a step S206.

In the step S205 responsive to at least one of the abnormalities, the warning image gradient ratio of the second pixel region 218 in the LCD 10 is controlled and kept to the maximum ratio R2max. Thereby, the device displays the warning image 216 on the second pixel region 218 with a luminance that is within a range between the maximum luminance B2max and the minimum luminance B2min and corresponds to the input adjust value.

On the other hand, in the step S206 responsive to determination of no abnormality, the warning image gradient ratio and the color tone of the second pixel region 218 in the LCD 10 are controlled and kept so that the warning image 216 is dissolved into the second background image 217. Thereby, the device turns the warning image 216 on the second pixel region 218 into an invisible condition seemingly. The device hides the outside image 16 from the driver's view by dissolving the outside image 16 into the background image 13.

As mentioned above, although the explanation was provided in a case where the first mode was set up as the control mode, if the control mode is set to the second mode in response to the input adjust value that is in a darker side than the reference value Cb in the step S201, the routine executes a steps S207 and S208 similar to the steps S107 and S108 in the first embodiment and proceeds to a step S209.

Then, a determination similar to the above-mentioned step S204 is performed based on the signal from the sensors 266 in the step S209. If the abnormality is determined, the routine proceeds to a step S210. If no abnormality is determined, the routine proceeds to a step S211.

In the step S210 responsive to at least one of the abnormalities, the warning image gradient ratio of the second pixel region 218 in the LCD 10 is controlled and kept to the maximum ratio R2max. As a result, the device displays the warning image 216 with the minimum luminance B2min on the second pixel region 218 irrespective of the meter image 12 displayed with a variable luminance on the first pixel region 14.

On the other hand, in the step S211 responsive to no abnormality, the warning image gradient ratio and the color tone of the second pixel region 218 in the LCD 10 are controlled and kept similar to the above-mentioned step S206 so that the warning image 216 is controlled in an invisible condition seemingly.

After execution of the step S205, S206, S210, and S211, the routine proceeds to a step S212 for determining whether the ignition switch is turned off or not. If an affirmative determination is made, the device completes the control flow. But, if a negative determination is made, the device returns to the step S201 and continues the control flow.

According to the second embodiment described above, the luminance of the warning image 216 is correctly adjusted by varying the source luminance of the light source 20, since the device performs the first mode during the input adjust value is in a side brighter than the reference value Cb. Further, if the input adjust value becomes a side darker than the reference value Cb, the device performs the second mode. Therefore, the luminance of the warning image 216 is kept at a level B2min that is at least necessary by keeping the source luminance of the light source 20 and the warning image gradient ratio. According to the above, the luminance of the meter image 12 is adjusted in a similar manner as in the first embodiment. Therefore, comparing to the meter image 12 in which a priority is given to a visibility, the luminance of the warning image 216 is adjusted to be suitable to the vehicle occupant's taste within a range as wide as possible. In addition, regarding the warning image 216, it is possible to certainly attain a fundamental objective of calling attention to the abnormality by keeping the minimum luminance.

In the second embodiment, the display controller portion 260 is the control means, the warning image 216 is the specific image, and one pixel or a plurality of pixels forming the second pixel region 218 is the first pixel.

Other Embodiment

As mentioned above, although a plurality of embodiments of the present invention has been described, the present invention shall not be interpreted within those embodiments, and can be applied to various embodiments without a deviation from an outline.

For example, in the first embodiment, the device may display a specific image that is an outside image 16 achieved by capturing an external region such as a forward region, a backward region and a side region of the vehicle by using a reflection of the visible light. In the second embodiment, in addition to the fuel empty abnormality and the temperature rise abnormality, for example, the device may detect a lock abnormality of a wheel on which an ABS system works, and display the specific image that is the warning image 216 corresponding to the detected result. Further, the first embodiment and the second embodiment may be combined to display both the outside image 16 and the warning image 216 as the specific image. Further, in the first embodiment and the second embodiment, in addition to or instead of the vehicle speed and the remaining fuel amount, the device may detect a vehicle condition indicative value such as a driven distance etc. from the sensors 66 and 266, and may display the regular image that is the meter image 12 corresponding to the detected result.

Although the LCD 10 and 210 and the light source 20 are controlled according to the adjust value inputted by the adjust switch 32 in the first and second embodiments, for example, the LCD 10 and 210 and the light source 20 may be controlled according to an adjust value that is set by the controller circuit 62 and 262 in accordance with an operational position of a lighting switch of the vehicle or a level of an outside illumination. In the first and second embodiment, when performing a gradient control to dissolve images each other, usually, a corresponding part of a liquid crystal is turned to an on state by always turning on a thin film transistor corresponding to an electrode for each sub-pixel in a display pixel in the LCD 10 and 210. Instead of the above, it is also possible to dissolve images each other by turning the corresponding part of the liquid crystal to an off state by turning off the thin film transistor corresponding to the electrode of each sub-pixel in the display pixel.

The first and second embodiments may use a reflection type LCD etc. instead of the transmission type LCD 10, and 210. In addition, the first and second embodiments may use, instead of the light source 20 which includes the light emitting diode 22 and the diffuser 24 in a combined manner, another light source suitable depending on the LCD type etc. among various kinds of source luminance adjustable light sources. In addition, the present invention may be applied to another application such as a vehicle display device provided as a head up display which virtually displays an image on an LCD to a combiner, instead of the vehicle display device 1 and 200 which functions as a combination meter.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A vehicle display device comprising: a liquid crystal display panel for displaying an image in a vehicle; a light source which illuminates the liquid crystal display panel; and a control means for controlling the liquid crystal display panel and the light source according to an adjust value for adjusting a luminance of a display image on the liquid crystal display panel, wherein the liquid crystal display panel has a first pixel for displaying a specific image at a specific time, and a second pixel for displaying a regular image at both the specific time and a regular time at which the specific image is not displayed by the first pixel, and wherein the control means controls a gradient ratio of the first pixel which is obtained by a ratio of a gradient level of the first pixel to a preset gradient level of the first pixel, and controls a gradient ratio of the second pixel which is obtained by a ratio of a gradient level of the second pixel to a preset gradient level of the second pixel, and wherein the control means selectively performs a first mode and a second mode, and wherein the control means varies a source luminance of the light source according to the adjust value brighter than a reference value while keeping the gradient ratio of both the first pixel and the second pixel at the maximum ratio in the first mode, and wherein the control means varies the gradient ratio of the second pixel according to the adjust value darker than the reference value while keeping the source luminance of the light source at the minimum source luminance and keeps the gradient ratio of the first pixel at the maximum ratio in the second mode.

2. The vehicle display device in claim 1, wherein
the reference value is the adjust value corresponding to a luminance that is at least necessary for displaying the specific image.

3. The vehicle display device as in claim 1, wherein
the control means controls the source luminance of the light source to the minimum source luminance, when the adjust value is equal to the reference value in the first mode, and controls the gradient ratio of the second pixel to the maximum ratio when the adjust value is equal to the reference value in the second mode.

4. The vehicle display device in claim 1, wherein
the specific image includes an outside image which is provided by capturing an external view at a specific time at which it is considered necessary to call attention to the external environment of the vehicle, and wherein
the regular image includes a meter image which shows a condition indicative value of the vehicle at both the regular time and the specific time.

5. The vehicle display device in claim 1, wherein
the specific image includes a warning image for warning an abnormality at the specific time at which an abnormality is generated on the vehicle, and wherein
the regular image includes a meter image which shows a condition indicative value of the vehicle in both the regular time and the specific time.

* * * * *